(12) United States Patent
Hosseini et al.

(10) Patent No.: US 12,267,781 B2
(45) Date of Patent: Apr. 1, 2025

(54) POWER SAVING IN SIDELINK

(71) Applicant: QUALCOMM Incorporated, San Diego, CA (US)

(72) Inventors: Seyedkianoush Hosseini, San Diego, CA (US); Yuchul Kim, San Diego, CA (US); Wanshi Chen, San Diego, CA (US); Karthika Paladugu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 17/654,697

(22) Filed: Mar. 14, 2022

(65) Prior Publication Data

US 2022/0295408 A1   Sep. 15, 2022

Related U.S. Application Data

(60) Provisional application No. 63/200,565, filed on Mar. 15, 2021.

(51) Int. Cl.
*H04W 52/02* (2009.01)
(52) U.S. Cl.
CPC .............................. *H04W 52/0235* (2013.01)
(58) Field of Classification Search
CPC ................................................ H04W 52/0235
See application file for complete search history.

(56) References Cited

U.S. PATENT DOCUMENTS

| | | | |
|---|---|---|---|
| 2013/0194991 A1* | 8/2013 | Vannithamby | H04B 7/024 370/311 |
| 2013/0265924 A1* | 10/2013 | Kim | H04W 76/28 370/311 |
| 2019/0200296 A1* | 6/2019 | Liu | H04W 52/0229 |
| 2020/0154354 A1* | 5/2020 | Awoniyi-Oteri | H04W 74/0833 |
| 2020/0214078 A1* | 7/2020 | Jiang | H04W 52/0216 |
| 2020/0296668 A1 | 9/2020 | Xu et al. | |
| 2020/0344722 A1* | 10/2020 | He | H04W 72/0446 |
| 2021/0007053 A1* | 1/2021 | Jiang | H04W 52/0293 |
| 2021/0037468 A1 | 2/2021 | Huang et al. | |
| 2021/0051587 A1 | 2/2021 | Wu et al. | |
| 2021/0058866 A1 | 2/2021 | Hosseini et al. | |
| 2022/0015034 A1* | 1/2022 | Miao | H04W 52/0235 |
| 2022/0159574 A1* | 5/2022 | Islam | H04W 52/0219 |
| 2022/0240189 A1* | 7/2022 | Mu | H04L 5/0053 |

(Continued)

FOREIGN PATENT DOCUMENTS

| | | |
|---|---|---|
| WO | 2020145878 A1 | 7/2020 |
| WO | 2020256462 A1 | 12/2020 |

OTHER PUBLICATIONS

International Search Report and Written Opinion—PCT/US2022/071161—ISA/EPO—Aug. 16, 2022 (2103460WO).

(Continued)

*Primary Examiner* — James P Duffy
(74) *Attorney, Agent, or Firm* — Harrity & Harrity, LLP

(57) ABSTRACT

Various aspects of the present disclosure generally relate to wireless communication. In some aspects, a user equipment (UE) may receive a power saving indication relating to sidelink communication. The UE may perform a power saving operation based at least in part on the power saving indication. Numerous other aspects are described.

30 Claims, 11 Drawing Sheets

(56) References Cited

U.S. PATENT DOCUMENTS

| | | | |
|---|---|---|---|
| 2023/0262601 A1* | 8/2023 | Ganesan | H04W 52/0245 370/311 |
| 2023/0262607 A1* | 8/2023 | Yang | H04W 52/0229 370/318 |

OTHER PUBLICATIONS

Intel Corporation: "Design of UE Sidelink Power Saving Solutions", 3GPP Draft, 3GPP TSG RAN WG1 Meeting #104-E, R1-2100672, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021 Jan. 19, 2021 (Jan. 19, 2021), XP0519711421, 19 Pages, Retrieved from the Internet: URL: https://ftp.3gpp.org/tsg_ran/WG1_RL1/TSGR1_104-e/Docs/R1-2100672.zip, R1-2100672 Intel—eV2X Power Saving.docx [retrieved on Jan. 19, 2021] Paragraph 5.5, Sections 1, 4., 5.1-5.3.

Partial International Search Report—PCT/US2022/071161—ISA/EPO—Jun. 23, 2022 (2103460WO).

\* cited by examiner

POWER SAVING IN SIDELINK

CROSS-REFERENCE TO RELATED APPLICATION

This Patent Application claims priority to U.S. Provisional Patent Application No. 63/200,565, filed on Mar. 15, 2021, entitled "POWER SAVING IN SIDELINK," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for power saving in sidelink.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors, coupled to the memory, configured to: receive a power saving indication relating to sidelink communication; and perform a power saving operation based at least in part on the power saving indication. The power saving indication may indicate that there is no more sidelink data that the UE is going to receive from another UE.

In some aspects, a network entity for wireless communication includes a memory and one or more processors, coupled to the memory, configured to: receive, from a first UE, an indication that the first UE is not to transmit data to a second UE; and transmit, to the second UE and based at least in part on the indication, a power saving indication relating to sidelink communication. The indication may be an indication that the first UE will not transmit data to the second UE, or that the first UE does not intend to transmit data to the second UE.

In some aspects, a method of wireless communication performed by a UE includes receiving a power saving indication relating to sidelink communication; and performing a power saving operation based at least in part on the power saving indication. The power saving indication may indicate that there is no more sidelink data that the UE is going to receive from another UE.

In some aspects, a method of wireless communication performed by a network entity includes receiving, from a first UE, an indication that the first UE is not to transmit data to a second UE; and transmitting, to the second UE and based at least in part on the indication, a power saving indication relating to sidelink communication. The indication may be an indication that the first UE will not transmit data to the second UE, or that the first UE does not intend to transmit data to the second UE. The power saving indication may relate to sidelink communication.

In some aspects, an apparatus for wireless communication includes means for receiving a power saving indication relating to sidelink communication; and means for performing a power saving operation based at least in part on the power saving indication. The power saving indication may indicate that there is no more sidelink data that the UE is going to receive from another UE.

In some aspects, an apparatus for wireless communication includes means for receiving, from a first UE, an indication that the first UE is not to transmit data to a second UE; and means for transmitting, to the second UE and based at least in part on the indication, a power saving indication relating to sidelink communication. The indication may be an indication that the first UE will not transmit data to the second UE, or that the first UE does not intend to transmit data to the second UE. The power saving indication may relate to sidelink communication.

In some aspects, a non-transitory computer-readable medium storing a set of instructions for wireless communication includes one or more instructions that, when executed by one or more processors of a UE, cause the UE to: receive a power saving indication relating to sidelink communication; and perform a power saving operation based at least in part on the power saving indication. The power saving indication may indicate that there is no more sidelink data that the UE is going to receive from another UE.

In some aspects, a non-transitory computer-readable medium storing a set of instructions for wireless communication includes one or more instructions that, when executed by one or more processors of a network entity, cause the network entity to: receive, from a first UE, an indication that the first UE is not to transmit data to a second UE; and transmit, to the second UE and based at least in part on the indication, a power saving indication relating to sidelink communication. The indication may be an indication that the first UE will not transmit data to the second UE, or that the first UE does not intend to transmit data to the second UE. The power saving indication may relate to sidelink communication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
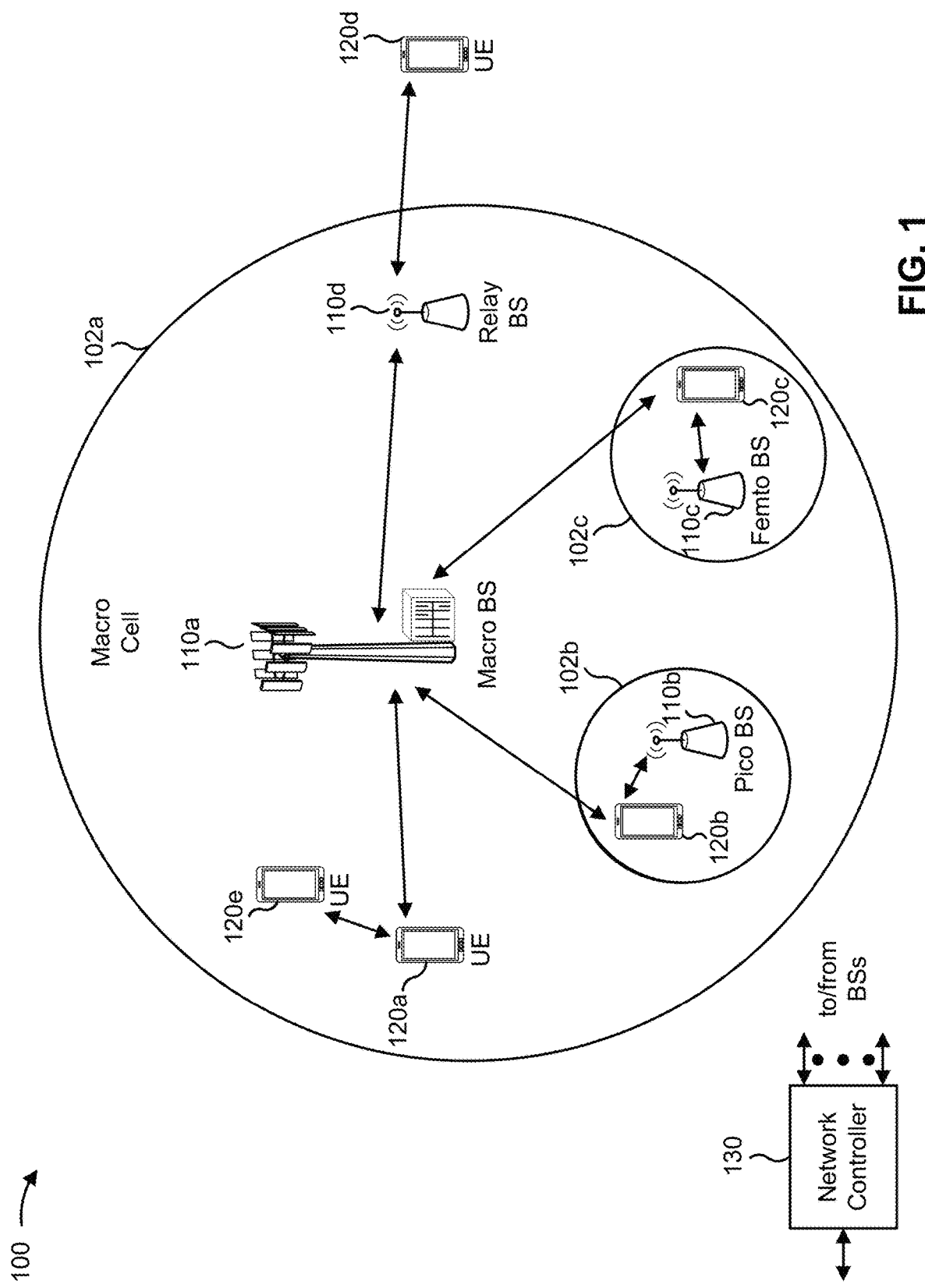
FIG. 1 is a diagram illustrating an example of a wireless network, in accordance with the present disclosure.

Power-efficient sidelink operation is important for extending the uptime of devices engaged in sidelink communication. However, sidelink communication lacks robust power-saving schemes. Some techniques and apparatuses described herein provide power-saving operations in sidelink. For example, the UE may receive a power saving indication, and the UE may perform a power saving operation based at least in part on receiving the power saving indication. In some aspects, a UE may enter a sleep state based at least in part on receiving a go-to-sleep (GTS) indication for sidelink. The GTS indication may indicate that there is no sidelink data that is to be transmitted to the UE. Thus, the UE may enter a sleep state when the UE will not receive sidelink data. In some aspects, a UE may receive, from another UE, a dynamic indication adapting a bandwidth that is monitored by the UE for sidelink. The indication may indicate that the other UE is to perform a sidelink transmission in only a portion of a sidelink resource pool. Thus, the UE may monitor the portion of the sidelink resource pool, rather than the entire sidelink resource pool, when the sidelink transmission is to occur in the portion of the sidelink resource pool. In this way, the UE does not stay awake unnecessarily and/or monitors only a portion of a sidelink resource pool, thereby conserving power at the UE, reducing a downtime of the UE, prolonging a time between charging of the UE, or the like. The UE may receive the power saving indication during an active time of a sidelink discontinuous reception operation. Accordingly, the UE may perform the power saving operation to conserve resources that would otherwise be expended when the UE is awake.

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
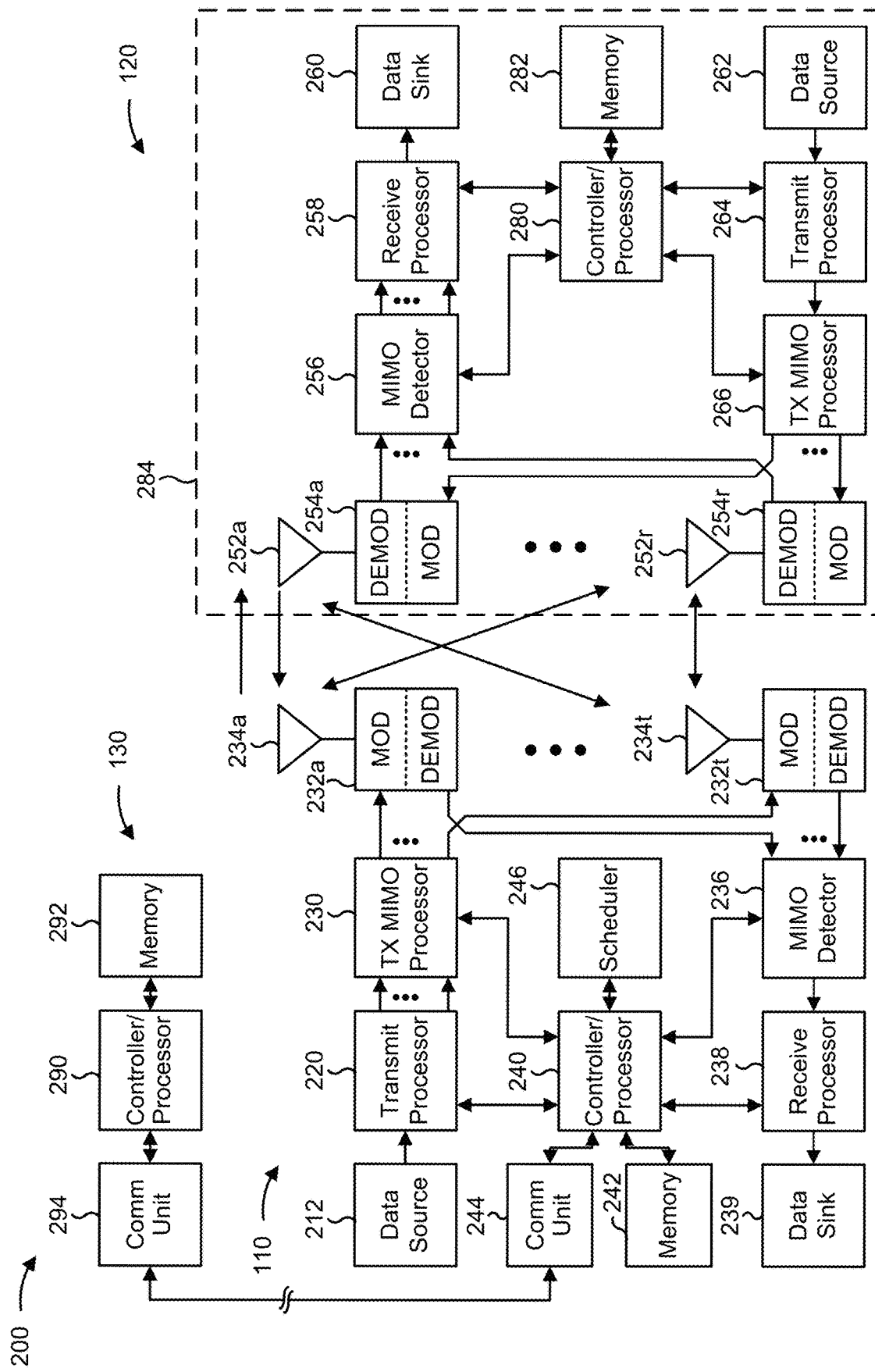
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 7-11).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 7-11).

Controller/processor 240 of base station 110, controller/processor 280 of UE 120, and/or any other component(s) of FIG. 2 may perform one or more techniques associated with power saving in sidelink discontinuous reception (DRX), as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, the UE includes means for receiving a power saving indication relating to sidelink communication; and/or means for performing a power saving operation based at least in part on the power saving indication. In some aspects, the UE includes means for transmitting, to another UE, a power saving indication relating to sidelink communication. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station includes means for receiving, from a first UE, an indication that the first UE is not to transmit data to a second UE; and/or means for transmitting, to the second UE and based at least in part on the indication, a power saving indication. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for determining, based at least in part on a buffer status report, that the first UE does not have data for transmission to the second UE.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
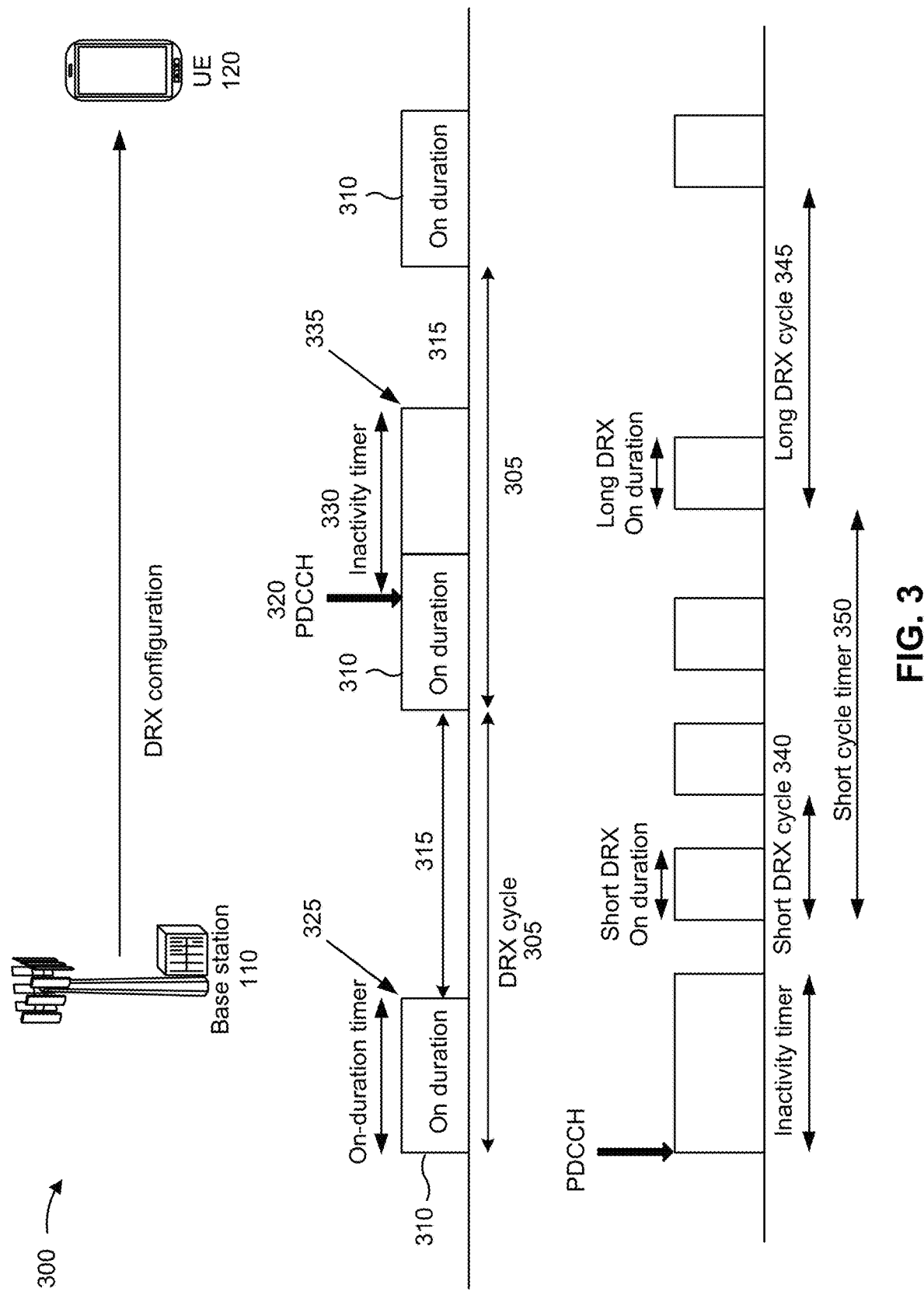
FIG. 3 is a diagram illustrating an example of a discontinuous reception (DRX) configuration, in accordance with the present disclosure.

FIG. 3 is a diagram illustrating an example 300 of a DRX configuration, in accordance with the present disclosure.

As shown in FIG. 3, a base station 110 may transmit a DRX configuration to a UE 120 to configure a DRX cycle 305 for the UE 120 (e.g., NR supports DRX for power saving for access link communication). A DRX cycle 305 may include a DRX on duration 310 (e.g., during which a UE 120 is awake or in an active state) and an opportunity to enter a DRX sleep state 315 (or a sleep mode). As used herein, the time during which the UE 120 is configured to be in an active state during the DRX on duration 310 may be referred to as an active time or an active duration, and the time during which the UE 120 is configured to be in the DRX sleep state 315 may be referred to as an inactive time or an inactive duration. As described below, the UE 120 may monitor a physical downlink control channel (PDCCH) during the active time, and may refrain from monitoring the PDCCH during the inactive time.

During the DRX on duration 310 (e.g., the active time), the UE 120 may monitor a downlink control channel (e.g., a PDCCH), as shown by reference number 320. For example, the UE 120 may monitor the PDCCH for downlink control information (DCI) pertaining to the UE 120. If the UE 120 does not detect and/or successfully decode any PDCCH communications intended for the UE 120 during the DRX on duration 310, then the UE 120 may enter the sleep state 315 (e.g., for the inactive time) at the end of the DRX on duration 310, as shown by reference number 325. In this way, the UE 120 may conserve battery power and reduce power consumption. As shown, the DRX cycle 305 may repeat with a configured periodicity according to the DRX configuration.

If the UE 120 detects and/or successfully decodes a PDCCH communication intended for the UE 120, then the UE 120 may remain in an active state (e.g., awake) for the duration of a DRX inactivity timer 330 (e.g., which may extend the active time). The UE 120 may start the DRX inactivity timer 330 at a time at which the PDCCH communication is received (e.g., in a transmission time interval (TTI) in which the PDCCH communication is received, such as a slot or a subframe). The UE 120 may remain in the active state until the DRX inactivity timer 330 expires, at which time the UE 120 may enter the sleep state 315 (e.g., for the inactive time), as shown by reference number 335. During the duration of the DRX inactivity timer 330, the UE 120 may continue to monitor for PDCCH communications, may obtain a downlink data communication (e.g., on a downlink data channel, such as a physical downlink shared channel (PDSCH)) scheduled by the PDCCH communication, and/or may prepare and/or transmit an uplink communication (e.g., on a physical uplink shared channel (PUSCH)) scheduled by the PDCCH communication. The UE 120 may restart the DRX inactivity timer 330 after each detection of a PDCCH communication for the UE 120 for an initial transmission (e.g., but not for a retransmission). By operating in this manner, the UE 120 may conserve battery power and reduce power consumption by entering the sleep state 315.

In addition, as shown, the UE 120 may be configured to use a short DRX cycle 340 and a long DRX cycle 345. The long DRX cycle 345 may be associated with longer durations for which the UE 120 is in a sleep state, between DRX on durations, relative to the short DRX cycle 340. In some examples, the on durations for the short DRX cycle 340 and the long DRX cycle 345 may be the same duration. The UE 120 may be configured (e.g., with the parameter drxShortCycleTimer) to use the short DRX cycle 340 until the expiration of a short cycle timer 350. After expiration of the short cycle timer 350, the UE 120 may switch to using the long DRX cycle 345.

As indicated above, FIG. 3 is provided as an example. Other examples may differ from what is described with respect to FIG. 3.

Figure 4:
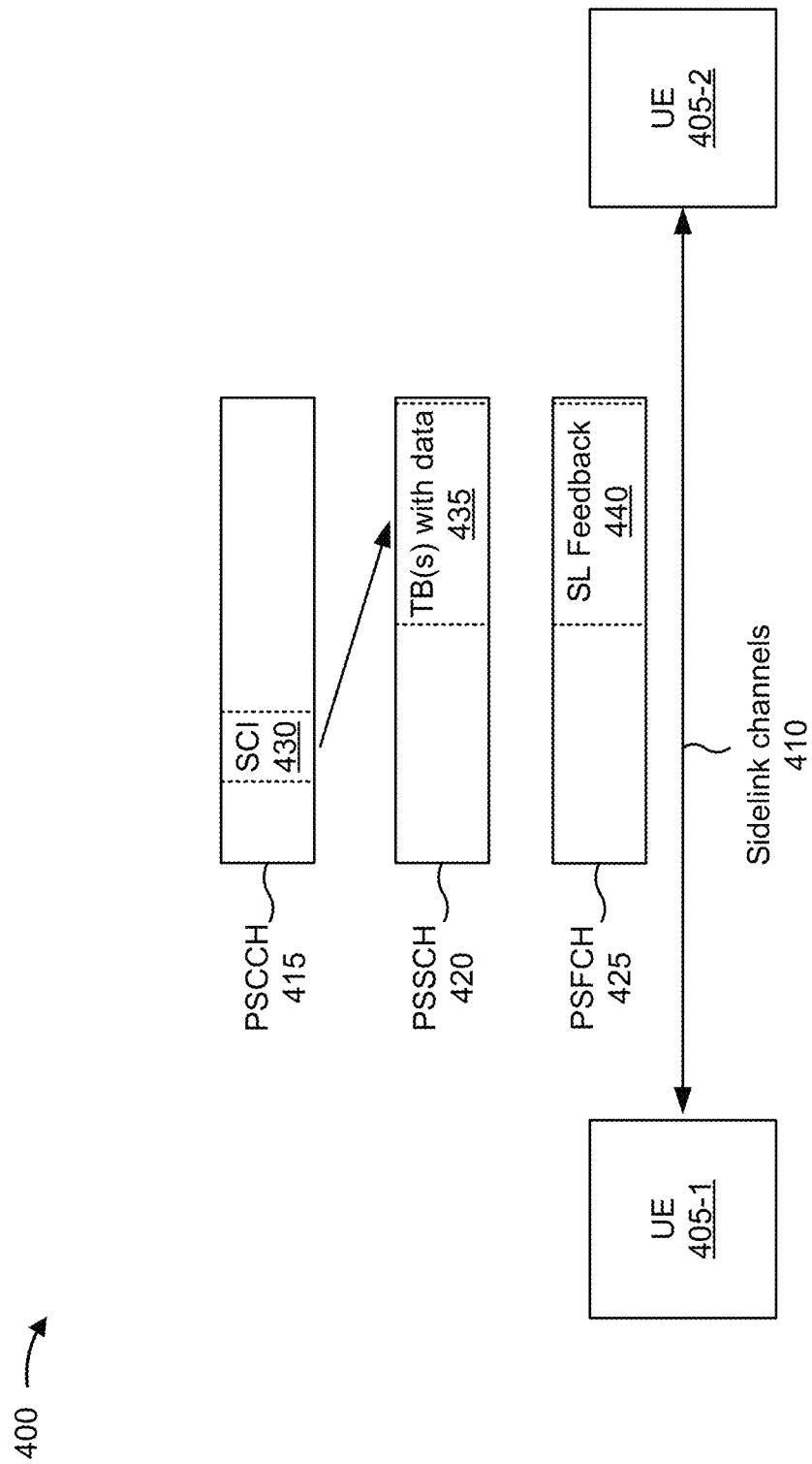
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs) via one or more sidelink channels 410. The UEs 405-1 and 405-2 may communicate using the one or more sidelink channels 410 for P2P communications, D2D communications, V2X communications (e.g., which may include V2V communications and/or V2I communications) and/or mesh networking. In some examples, the UEs 405 (e.g., UE 405-1 and/or UE 405-2) may correspond to one or more other UEs described elsewhere herein, such as UE 120. In some examples, the one or more sidelink channels 410 may use a PC5 interface and/or may operate in a high frequency band (e.g., the 5.9 GHz band). Additionally, or alternatively, the UEs 405 may synchronize timing of TTIs (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a PDCCH and/or a physical uplink control channel (PUCCH) used for cellular communications with a base station 110 via an access link or an access channel. The PSSCH 420 may be used to communicate data, similar to a PDSCH and/or a PUSCH used for cellular communications with a base station 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARD) feedback (e.g., acknowledgement or negative acknowledgement (ACK/NACK) information), transmit power control (TPC), and/or a scheduling request (SR).

In some examples, the one or more sidelink channels 410 may use resource pools. For example, a scheduling assignment (e.g., included in SCI 430) may be transmitted in sub-channels using specific resource blocks (RBs) across time. In some examples, data transmissions (e.g., on the PSSCH 420) associated with a scheduling assignment may occupy adjacent RBs in the same subframe as the scheduling assignment (e.g., using frequency division multiplexing). In some examples, a scheduling assignment and associated data transmissions are not transmitted on adjacent RBs.

In some examples, a UE 405 may operate using a transmission mode where resource selection and/or scheduling is performed by a base station 110 (e.g., the base station 110 schedules sidelink communications in a PDCCH). This mode may be referred to as Mode 1. In some examples, a UE 405 may operate using a transmission mode where resource selection and/or scheduling is performed by the UE 405 (e.g., rather than a base station 110). This mode may be referred to as Mode 2.

In the transmission mode where resource selection and/or scheduling is performed by a UE 405, the UE 405 may perform resource selection and/or scheduling by sensing channel availability for transmissions. For example, the UE 405 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy rate (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or an MCS to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

In some aspects, a UE 405 may use two-stage SCI, in which SCI is provided in a first stage and a second stage. The first stage may be referred to as SCI-1 and the second stage may be referred to as SCI-2. SCI-1 may be transmitted on a PSCCH. SCI-1 may indicate UE resource reservations. Additionally, or alternatively, SCI-1 may include a resource allocation and may include information for decoding SCI-2 (e.g., a format of SCI-2 and/or other information). The resource allocation may indicate resources for SCI-2. SCI-2 may be transmitted on a PSSCH. SCI-2 may include information for decoding a PSSCH.

As indicated above, FIG. 4 is provided as an example. Other examples may differ from what is described with respect to FIG. 4.

Figure 5:
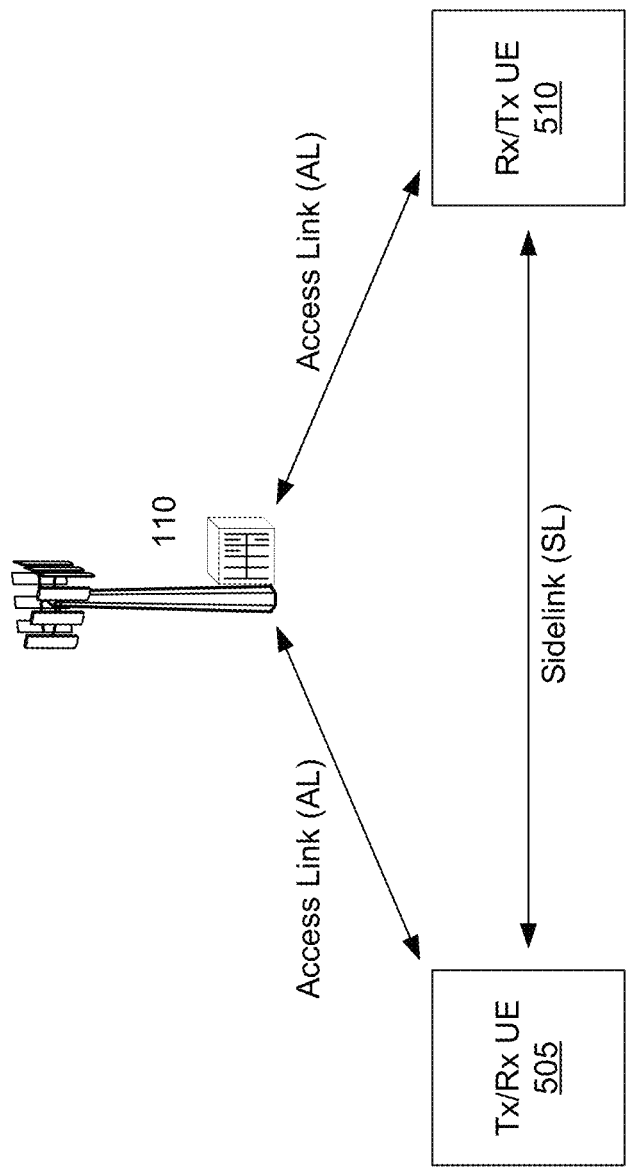
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a base station 110 may communicate with the Tx/Rx UE 505 via a first access link. Additionally, or alternatively, in some sidelink modes, the base station 110 may communicate with the Rx/Tx UE 510 via a second access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 5 is provided as an example. Other examples may differ from what is described with respect to FIG. 5.

Figure 6:
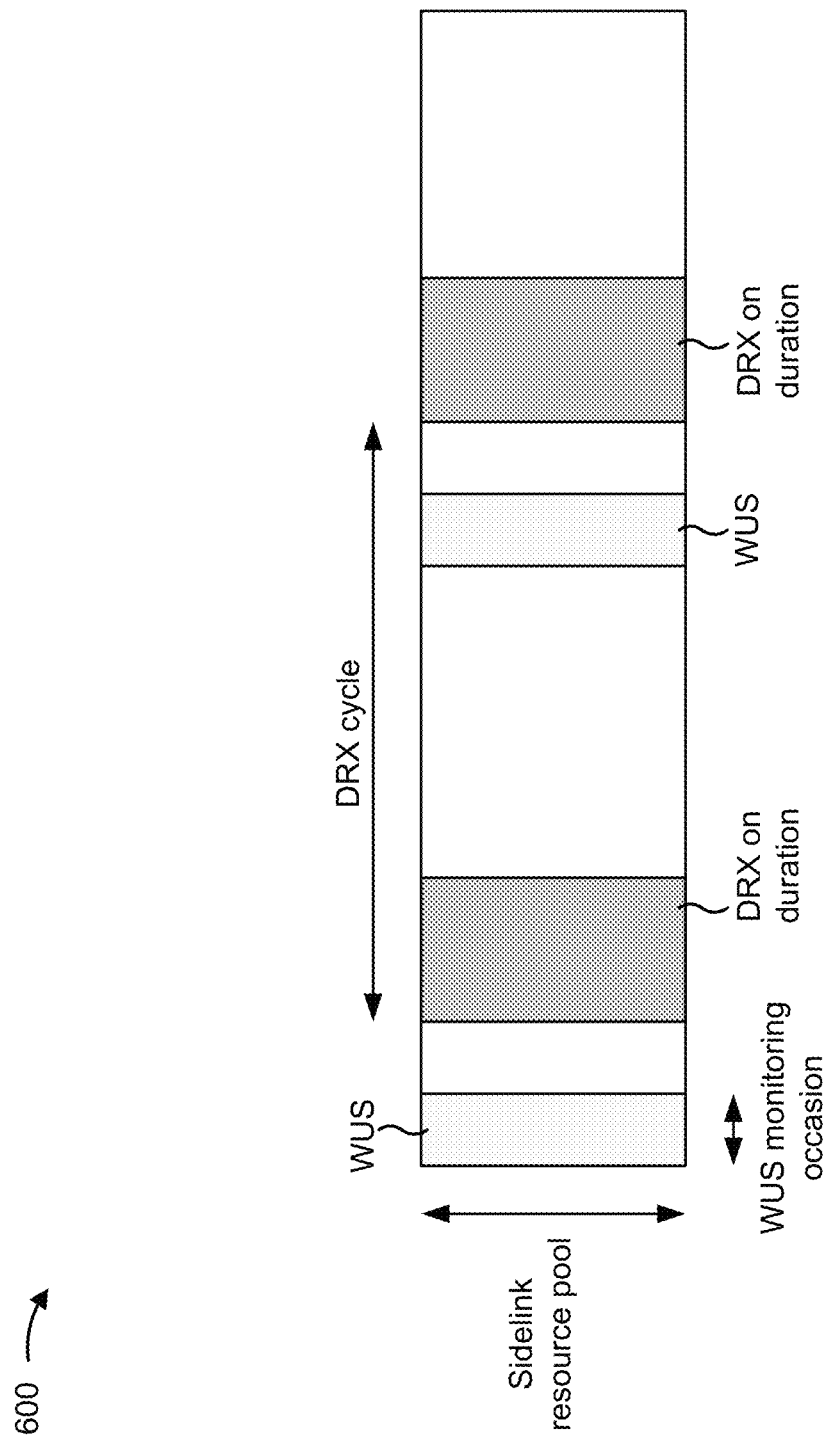
FIG. 6 is a diagram illustrating an example of a sidelink wakeup signal (WUS), in accordance with the present disclosure.

FIG. 6 is a diagram illustrating an example 600 of a sidelink wakeup signal (WUS), in accordance with the present disclosure.

DRX, as described above in connection with FIG. 3, may be supported for sidelink communication. For example, a UE, engaged in sidelink communication, may wake up during a DRX active duration, as described above. An inactivity timer, as described above, may be used to keep the UE awake (e.g., in an active state) outside of a configured DRX active duration (e.g., if a peer UE has additional transmissions for the UE). For example, if a non-zero inactivity timer is configured for the UE, and if the UE receives SCI that indicates resource reservations/transmissions outside of the UE's configured active duration, then the UE may extend the active duration (e.g., for the duration of the inactivity timer). Otherwise, the UE may go to sleep.

In addition, sidelink DRX may utilize a sidelink WUS. Here, the UE may temporarily transition out of a sleep state (e.g., by activating one or more modules and/or components, such as a baseband processor) during the UE's inactive time in order to monitor for a WUS during a time period (e.g., a WUS monitoring occasion, which is outside of a DRX active time). The WUS may indicate whether the UE is to wake up during the next DRX on duration. If the UE does not detect the presence of the WUS during the time period, the UE may return to the sleep state until the UE is to again monitor for the WUS. If the UE detects the presence of the WUS, the UE may transition to the active state (e.g., in a DRX on duration) in order to receive a sidelink communication (e.g., a PSCCH communication, a PSSCH communication, or the like).

In this way, the WUS enables the UE to refrain from waking during a DRX active time if there is no data for the UE to receive (e.g., the UE does not wake up unnecessarily). For example, if a first UE has data to transmit to a second UE, the first UE can transmit (e.g., in a WUS occasion) an indication as a WUS to the second UE. Upon reception of the WUS, the second UE may wake and monitor sidelink resource pool resources for data.

As indicated above, FIG. 6 is provided as an example. Other examples may differ from what is described with respect to FIG. 6.

In access link communication, a UE may use one or more schemes for power saving. In one example, the UE may use PDCCH skipping to conserve power. Here, a base station may indicate to the UE that the UE can skip monitoring a PDCCH for a particular time duration. Thus, during the time duration, the UE does not transmit or receive a dynamically granted channel. In another example, rather than skipping PDCCH monitoring, the base station may indicate to the UE that the UE can switch from a current search space to a new search space for PDCCH monitoring. Here, the new search space may be associated with a larger periodicity for PDCCH candidates relative to the current search space.

Sidelink communication, as described above, is widely used for various use cases, such as for communications involving smart wearable devices, IoT, reduced capability devices, and/or industrial IoT. Thus, power-efficient sidelink operation is important for extending the uptime of devices engaged in sidelink communication. However, sidelink communication lacks robust power-saving schemes, such as those described above for access link communication. Some techniques and apparatuses described herein provide power-saving operations in sidelink. In some aspects, a UE may enter a sleep state based at least in part on receiving a go-to-sleep (GTS) indication for sidelink. In some aspects, a UE may receive, from another UE, a dynamic indication adapting a bandwidth that is monitored by the UE for sidelink. In this way, the UE does not stay awake unnecessarily and/or monitors only a portion of a sidelink resource pool, thereby conserving power at the UE, reducing a downtime of the UE, prolonging a time between charging of the UE, or the like.

Figure 7:
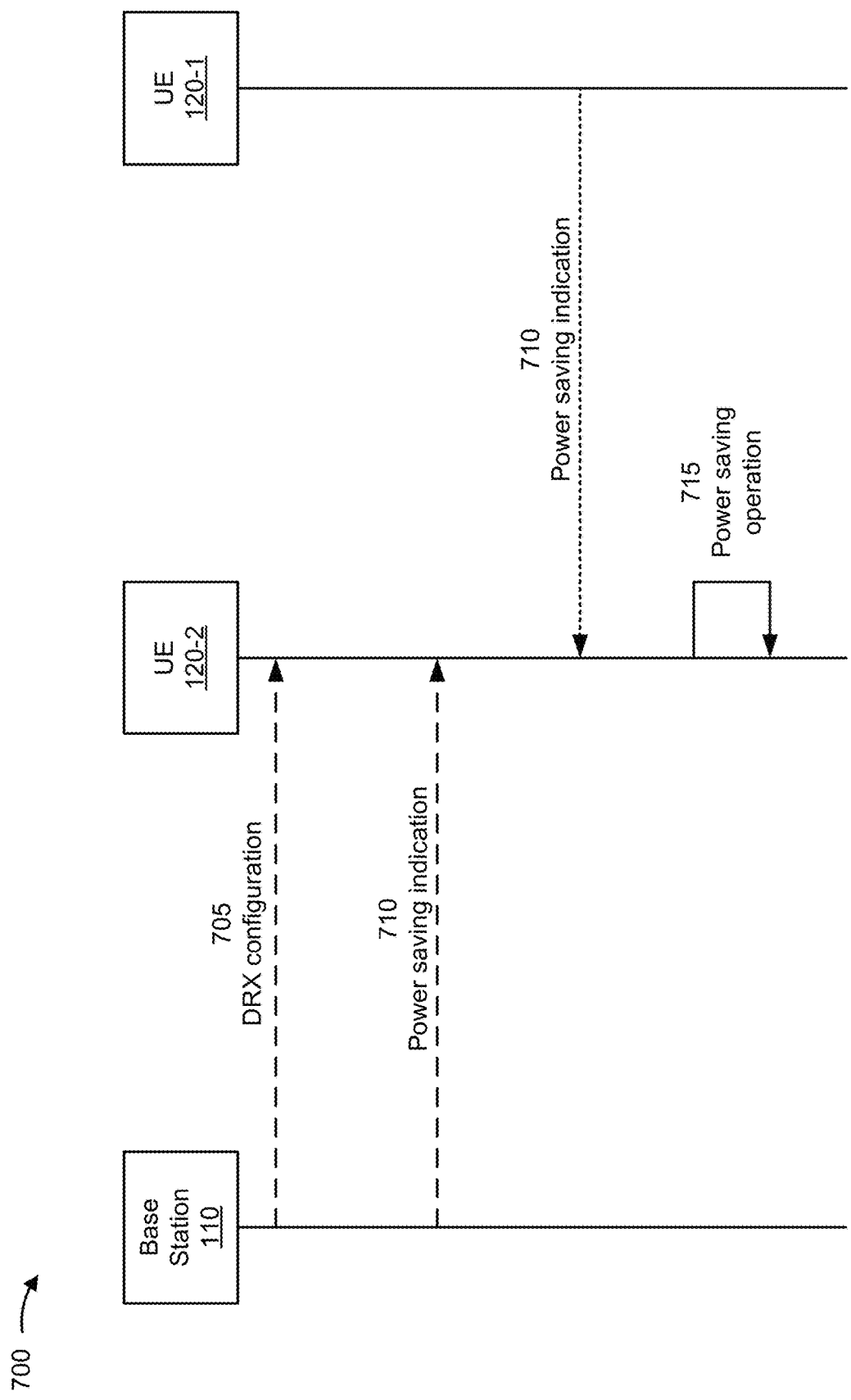
FIG. 7 is a diagram illustrating an example associated with power saving in sidelink, in accordance with the present disclosure.

FIG. 7 is a diagram illustrating an example 700 associated with power saving in sidelink, in accordance with the present disclosure. As shown in FIG. 7, a first UE 120-1 and a second UE 120-2 may communicate with one another (e.g., via a sidelink) and/or a base station 110 and the second UE 120-2 may communicate with one another (e.g., via an access link). In some aspects, the base station 110, the first UE 120-1, and/or the second UE 120-2 may be included in a wireless network, such as wireless network 100. In some aspects, the first UE 120-1 and the second UE 120-2 may be included in a wireless sidelink network, such as an ad hoc network.

As shown by reference number 705, the base station 110 may transmit, and the second UE 120-2 may receive, a DRX configuration. The DRX configuration may be for sidelink DRX, as described above. For example, the sidelink DRX configuration may configure an on duration, an inactivity timer, a DRX cycle, or the like, as described above. In some aspects, the sidelink DRX configuration, or another configuration, may configure a sidelink WUS (e.g., locations of WUS monitoring occasions) for sidelink DRX. In some aspects, the second UE 120-2 may receive the DRX configuration (and/or the other configuration) from the first UE 120-1.

The second UE 120-2 may perform a DRX operation based at least in part on the DRX configuration (and/or the other configuration). For example, the second UE 120-2 may transition between an awake state (e.g., an active state) and a sleep state (e.g., an inactive state) in accordance with the DRX configuration (and/or the other configuration). "Sleep state" may refer to a state of a UE with a particular group of parameters set for the UE, such as parameters set to have an antenna panel powered off, have circuitry associated with an antenna panel powered off, have circuitry associated with monitoring signals received at an antenna panel powered off, have receive power reduced relative to a non-sleep state (e.g., an awake state), refrain from monitoring for received signals, deactivate one or more component carriers, or the like.

As shown by reference number 710, the second UE 120-2 may receive a power saving indication. The second UE 120-2 may receive the power saving indication from the base station 110 and/or from the first UE 120-1 (e.g., the base station 110 and/or the first UE 120-1 may transmit the power saving indication). For example, in some aspects, the first UE 120-1 may transmit the power saving indication to the second UE 120-2. The power saving indication may relate to sidelink communication of the second UE 120-2. For example, the power saving indication may relate to one or more sidelinks (e.g., one or more sidelink sessions, each associated with a different source identifier and/or destination identifier, as described below) of the second UE 120-2 with one or more other UEs (e.g., the first UE 120-1). The second UE 120-2 may receive the power saving indication during a sidelink DRX active time of a sidelink DRX operation performed by the second UE 120-2 (e.g., in accordance with the DRX configuration). However, in some aspects, the second UE 120-2 may receive the power saving indication during another time period and/or regardless of whether DRX is configured for the second UE 120-2.

In some aspects, the power saving indication may include a GTS indication. The GTS indication (e.g., a GTS signal) may indicate that the second UE 120-2 is not to (e.g., will not) receive sidelink data (e.g., there is no more sidelink data that the second UE 120-2 is going to receive from another UE, such as the first UE 120-1). For example, the base station 110 and/or the first UE 120-1 may transmit, to the second UE 120-2, the GTS indication indicating that the first UE 120-1 has no more sidelink data for transmission to the second UE 120-2. Thus, the power saving indication may indicate that the second UE 120-2 is not to (e.g., will not) receive sidelink data (e.g., there is no more sidelink data that the second UE 120-2 is going to receive from another UE, such as the first UE 120-1).

Accordingly, the GTS indication may indicate that the second UE 120-2 may go to sleep (e.g., enter a sleep state). That is, the GTS indication may indicate that the second UE 120-2 may refrain from monitoring a PSCCH and/or PSSCH. In some aspects, the GTS indication may indicate (e.g., using a single bit) whether the second UE 120-2 may go to sleep (e.g., indicate whether the second UE 120-2 is to receive sidelink data). Additionally, or alternatively, the GTS indication may indicate a time duration for which the second UE 120-2 is to sleep.

In some aspects, the time duration may be a remaining portion of the DRX active time in which the GTS indication is received (that is, the current DRX active time). For example, the GTS indication may indicate that the second UE 120-2 is to skip the remaining portion of the current DRX active time, and that the second UE 120-2 is to operate in a sleep state until the next DRX active time. In some aspects, the time duration may be a quantity of time intervals (e.g., slots) of the current DRX active time. For example, the GTS indication may indicate that the second UE 120-2 is to skip (e.g., operate in a sleep state for) a portion of time intervals (e.g., slots) in the current DRX active time. The time intervals may be consecutive or non-consecutive. In some aspects, the time duration may be multiple DRX active times. For example, the GTS indication may indicate a quantity of DRX active times that the second UE 120-2 is to skip (e.g., operate in a sleep state).

In some aspects, the time duration may be indicated by a semi-static configuration (e.g., a radio resource control (RRC) configuration) of the second UE 120-2 and/or indicated by a fixed rule (e.g., a rule indicating that the second UE 120-2 is to wake up for the next DRX cycle, or a rule indicating any of the other time durations described above). For example, the GTS indication may indicate only whether the second UE 120-2 is to receive sidelink data (e.g., a single-bit indication), as described above, and the second UE 120-2 may determine the time duration in accordance with the semi-static configuration and/or the rule. In some aspects, the semi-static configuration and/or the rule is particular to a sidelink resource pool in which the second UE 120-2 is communicating (e.g., different sidelink resource pools may be associated with different configurations and/or rules). In some aspects, the GTS indication may indicate that the second UE 120-2 is to sleep (e.g., skip monitoring a PSCCH and/or a PSSCH) until a next WUS monitoring occasion of the DRX operation.

In some aspects, the power saving indication may include a bandwidth indication (e.g., indicate a bandwidth adaptation). For example, the second UE 120-2 may receive the bandwidth indication instead of the GTS indication (e.g., the second UE 120-2 may receive the bandwidth indication from the base station 110 and/or the first UE 120-1 when the first UE 120-1 has sidelink data for transmission to the second UE 120-2). The bandwidth indication may indicate that a sidelink transmission from the first UE 120-1 to the second UE 120-2 is to occur in only a portion of a bandwidth of a sidelink resource pool (e.g., in a narrower bandwidth that is less than an entire bandwidth of the sidelink resource pool). As an example, the first UE 120-1 may transmit the bandwidth indication to the second UE 120-2, and the bandwidth indication may indicate that the first UE 120-1 is going to transmit to the second UE 120-2 over only the portion of the bandwidth of the sidelink resource pool. Thus, a transmission from the first UE 120-1 to the second UE 120-2 (e.g., in accordance with the bandwidth indication) may only use resources in the narrower bandwidth indicated by the bandwidth indication. However, the first UE 120-1 (e.g., when operating in Mode 2 for sidelink resource allocation) may still monitor the entire bandwidth of the sidelink resource pool in order to obtain resource reservation information associated with other UEs.

In some aspects, the power saving indication (e.g., the GTS indication and/or the bandwidth indication) may be a sequence-based indication. That is, the power saving indication (e.g., transmitted by the first UE 120-1) may be carried by a sequence. In some aspects, particular time and frequency resources in a sidelink resource pool may be allocated for the transmission and/or reception of the power saving indication (e.g., the GTS indication). Occasions for transmitting and/or monitoring for the power saving indication (e.g., the particular time and frequency resources) may be based at least in part on (e.g., dependent upon) a source identifier associated with the power saving indication (e.g., an identifier of the first UE 120-1), a destination identifier associated with the power saving indication (e.g., an identifier of the second UE 120-2), a cast type (e.g., unicast, groupcast, broadcast, or the like) associated with the power saving indication, and/or a zone identifier (e.g., that identifies a geographic area) associated with the first UE 120-1 and/or the second UE 120-2.

In some aspects, the power saving indication (e.g., the GTS indication) may be indicated by the sequence. For example, the particular command indicated by the power saving indication (e.g., whether the second UE 120-2 is to receive sidelink data, the time duration for which the second UE 120-2 is to sleep, or the like) may be indicated by the sequence. In some aspects, the particular command indicated by the power saving indication, or a portion thereof, may be implied by the transmission of the sequence. For example, the particular command, or the portion thereof, may be a function of a time interval (e.g., a slot) used for transmitting the power saving indication.

In some aspects, the power saving indication (e.g., the GTS indication and/or the bandwidth indication) may be indicated in a communication of a PSCCH or a PSSCH (e.g., the power saving indication may be PSCCH-based and/or PSSCH-based). For example, the power saving indication may be included in SCI, such as SCI-1 (e.g., transmitted in a PSCCH) or SCI-2 (e.g., transmitted in a PSSCH), or included in a medium access control control element (MAC-CE) (e.g., transmitted in a PSSCH). As an example, a data transmission from the first UE 120-1 to the second UE 120-2 may additionally include the power saving indication (e.g., include the GTS indication indicating the time duration).

In some aspects, the power saving indication (e.g., the GTS indication and/or the bandwidth indication) may identify a source identifier (e.g., a source UE sidelink identifier) associated with the power saving indication and/or a destination identifier (e.g., a destination UE sidelink identifier) associated with the power saving indication. The source identifier may be associated with the UE transmitting the power saving indication (e.g., the first UE 120-1), and the destination identifier may be associated with the UE receiving the power saving indication (e.g., the second UE 120-2). In sidelink, communications across UEs are identified by source and destination identifiers. Moreover, source and destination identifiers may be specific to a particular link (that is, a particular sidelink session). For example, the first UE 120-1 and the second UE 120-2 may be engaged in communication via two different applications, each application associated with a respective link/sidelink session, and the source and destination identifiers used for the first UE 120-1 and the second UE 120-2 may be different for the respective links/sidelink sessions.

In some aspects, the second UE 120-2 may receive the power saving indication (e.g., the GTS indication and/or the bandwidth indication) from the base station 110 when the Uu (that is, access link) identity of the second UE 120-2 is known to the base station 110. In sidelink Mode 1 resource allocation, as described above, the base station 110 may know (e.g., store information indicating) the destination identifier (e.g., sl-DestinationIdentity-r16) of a receiving sidelink UE (e.g., the second UE 120-2). However, typically, the base station 110 may not know (e.g., may not store information indicating) an association between the destination identifier and a Uu identity of the receiving sidelink UE. In some aspects, the base station 110 may store information indicating an association between the destination identifier of the second UE 120-2 and the Uu identity of the second UE 120-2. For example, the first UE 120-1 and the second UE 120-2 may exchange information identifying respective Uu identities of the first UE 120-1 and the second UE 120-2 (e.g., exchange access link identity information), and the first UE 120-1 may transmit information to the base station 110 indicating the Uu identity of the second UE 120-2 (e.g., in connection with transmitting information indicating the destination identifier of the second UE 120-2). That is, the first UE 120-1 may transmit, and the base station 110 may receive, information that identifies a sidelink destination identifier associated with the second UE 120-2 and an access link identity associated with the second UE 120-2 (e.g., that was obtained by the first UE 120-1 during an exchange of sidelink identity information between the first UE 120-1 and the second UE 120-2).

In some aspects, the first UE 120-1 may transmit, and the base station 110 may receive, an indication that the first UE 120-1 is not to (e.g., will not or does not intend to) transmit data to the second UE 120-2 (e.g., an indication that the first UE 120-1 has no data for transmission to the second UE 120-2). That is, the indication may be an indication that the first UE will not transmit data to the second UE, or that the first UE does not intend to transmit data to the second UE. In some aspects, the indication may indicate that the first UE 120-1 is to transmit data to the second UE 120-2 (e.g., in a portion of a bandwidth of a sidelink resource pool). Thus, the indication may indicate whether the first UE 120-1 is to transmit data to the second UE 120-2. In some aspects, the indication may identify a sidelink destination identifier, and an access link identity, associated with the second UE 120-2 (e.g., obtained by the first UE 120-1 during an exchange of sidelink identity information between the first UE 120-1 and the second UE 120-2). In some aspects, the indication may be a sidelink buffer status report (e.g., the base station 110 may receive a sidelink buffer status report from the first UE 120-1). The base station 110 may determine (e.g., infer), based at least in part on the buffer status report, that the first UE 120-1 does not have data for transmission to the second UE 120-2. For example, the base station 110 may determine that the buffer status report does not indicate data for transmission to the destination identifier associated with the second UE 120-2. In some aspects, the indication may explicitly indicate that the first UE 120-1 does not have data for transmission to the second UE 120-2. For example, the explicit indication may be transmitted by the first UE 120-1 via signaling designated for indicating a lack of data for transmission. As another example, the explicit indication may be an indication of an empty buffer at the first UE 120-1 (e.g., a BSR0 message transmitted by the first UE 120-1).

Based at least in part on receiving the indication from the first UE 120-1, the base station 110 may transmit the power saving indication (e.g., the GTS indication) to the second UE 120-2. For example, the base station 110 may transmit the power saving indication to the second UE 120-2 based at least in part on the association between the sidelink destination identifier of the second UE 120-2 and the Uu identity of the second UE 120-2. In some aspects, the base station 110 may transmit the power saving indication to the second UE 120-2 in a PDCCH (e.g., using the Uu identity of the second UE 120-2).

As shown by reference number 715, the second UE 120-2 may perform a power saving operation based at least in part on the power saving indication. "Power saving operation" may refer to one or more operations of a UE that reduce a power consumption of the UE (e.g., relative to a power consumption of the UE when the one or more operations are not performed).

In some aspects, when performing the power saving operation, the second UE 120-2 may enter a sleep state (e.g., transition from an active state to a sleep state). For example, the second UE 120-2 may enter the sleep state (in connection with performing the power saving operation) based at least in part on receiving a GTS indication from first UE 120-1 or the base station 110. In the sleep state, the second UE 120-2 may refrain from monitoring a PSCCH and/or a PSSCH. In this way, the second UE 120-2 may reduce power consumption. The second UE 120-2 may remain in the sleep state for the time duration associated with the GTS indication, as described above. Thus, the second UE 120-2 may transition from the sleep state to the active state upon expiration of the time duration.

In some aspects, in the sleep state (e.g., during a sleep duration), the second UE 120-2 may monitor WUS monitoring occasions associated with the UE that transmitted the power saving indication (e.g., first UE 120-1). In some aspects, in the sleep state (e.g., during a sleep duration), the second UE 120-2 may refrain from monitoring (e.g., skip monitoring) WUS monitoring occasions associated with the UE that transmitted the power saving indication (e.g., first UE 120-1) for the time duration associated with the GTS indication. In some aspects, the second UE 120-2 may receive, from the base station 110 and/or the first UE 120-1, an indication of whether the second UE 120-2 is to monitor WUS monitoring occasions in the sleep state (e.g., during a sleep duration). For example, the power saving indication may indicate whether the second UE 120-2 is to monitor WUS occasions during a sleep duration.

In some aspects, the second UE 120-2 may enter the sleep state based at least in part on transmitting acknowledgment feedback for the power saving indication (e.g., received in SCI, in a sequence, in a PSCCH communication, in a PSSCH communication, or the like). For example, when the power saving indication is received by the second UE 120-2 in SCI (e.g., SCI-1 and/or SCI-2), the second UE 120-2 may enter the sleep state based at least in part on transmitting acknowledgment feedback for the SCI (e.g., for a transport block associated with the SCI). In other words, the second UE 120-2 may enter the sleep state only if the second UE 120-2 transmitted acknowledgment feedback for the SCI. In this way, if the second UE 120-2 does not properly receive the SCI that includes the power saving indication (e.g., the second UE 120-2 transmitted negative acknowledgment feedback for the SCI), the second UE 120-2 may remain in an active state in order to receive a retransmission of the SCI from the first UE 120-1.

In some aspects, the second UE 120-2 may enter the sleep state based at least in part on a determination that the second UE 120-2 received (e.g., in the current DRX active time) a GTS indication for each link/sidelink session of the second UE 120-2. That is, the second UE 120-2 may refrain from entering the sleep state (even if a GTS indication is received) if there is at least one link/sidelink session of the second UE 120-2 for which the second UE 120-2 did not receive (e.g., in the current DRX active time) a GTS indication.

In some aspects, when performing the power saving operation, the second UE 120-2 may monitor a PSCCH and/or a PSSCH in only a portion of a bandwidth of a sidelink resource pool (e.g., in a narrower bandwidth that is less than an entire bandwidth of the sidelink resource pool). For example, the second UE 120-2 may monitor a PSCCH and/or a PSSCH in only the portion of the bandwidth (in connection with performing the power saving operation) based at least in part on receiving a bandwidth indication from first UE 120-1. In this way, the second UE 120-2 may refrain from monitoring for SCI outside of the narrower bandwidth (which may be considered as a sidelink counterpart to the search space switching for access link described above). Accordingly, the second UE 120-2 may conserve power by reducing RF bandwidth and receiving and/or transmitting over a relatively smaller portion of the sidelink resource pool.

The portion of the bandwidth that is to be monitored by the second UE 120-2 may be indicated by the bandwidth indication, as described above. The second UE 120-2 may continue to monitor only the portion of the bandwidth until a new bandwidth indication is received or for a particular time duration, as described above (e.g., the second UE 120-2 may return to monitoring the entire bandwidth if indicated by the new bandwidth indication or upon expiration of the time duration). The second UE 120-2 may receive a sidelink data transmission from the first UE 120-1 in the portion of the bandwidth.

As indicated above, FIG. 7 is provided as an example. Other examples may differ from what is described with respect to FIG. 7.

Figure 8:
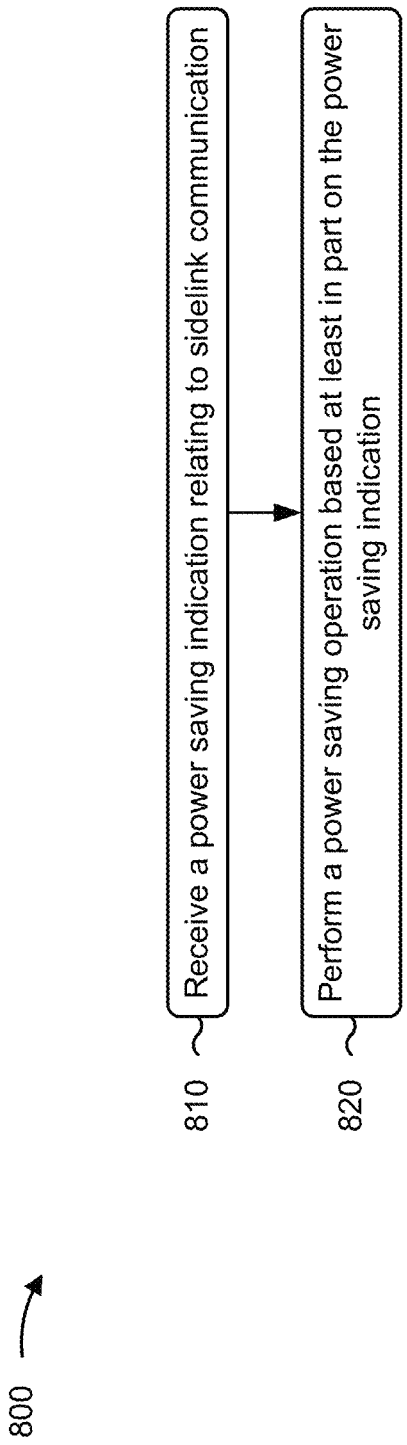
FIGS. 8-9 are diagrams illustrating example processes associated with power saving in sidelink, in accordance with the present disclosure.

FIG. 8 is a diagram illustrating an example process 800 performed, for example, by a UE, in accordance with the present disclosure. Example process 800 is an example where the UE (e.g., UE 120) performs operations associated with power saving in sidelink.

As shown in FIG. 8, in some aspects, process 800 includes receiving a power saving indication relating to sidelink communication (block 810). For example, the UE (e.g., using reception component 1002, depicted in FIG. 10) may receive a power saving indication relating to sidelink communication, as described above.

As further shown in FIG. 8, in some aspects, process 800 includes performing a power saving operation based at least in part on the power saving indication (block 820). For example, the UE (e.g., using monitoring component 1008 depicted in FIG. 10) may perform a power saving operation based at least in part on the power saving indication, as described above.

Process 800 may include additional aspects, such as any single aspect or any combination of aspects described below and/or in connection with one or more other processes described elsewhere herein.

In a first aspect, the power saving indication is received during an active time of a sidelink discontinuous reception operation.

In a second aspect, alone or in combination with the first aspect, the power saving indication is received from another UE or a base station.

In a third aspect, alone or in combination with one or more of the first and second aspects, the power saving indication is received in sidelink control information, and the power saving operation is performed based at least in part on transmitting acknowledgment feedback for the sidelink control information.

In a fourth aspect, alone or in combination with one or more of the first through third aspects, the power saving indication is a sequence-based indication.

In a fifth aspect, alone or in combination with one or more of the first through fourth aspects, the power saving indication is indicated in a communication of a physical sidelink control channel or a physical sidelink shared channel.

In a sixth aspect, alone or in combination with one or more of the first through fifth aspects, the power saving indication identifies at least one of a source identifier or a destination identifier associated with the power saving indication.

In a seventh aspect, alone or in combination with one or more of the first through sixth aspects, the power saving operation is entering a sleep state.

In an eighth aspect, alone or in combination with one or more of the first through seventh aspects, the power saving indication indicates that the UE is not to receive data from another UE.

In a ninth aspect, alone or in combination with one or more of the first through eighth aspects, the power saving indication indicates a duration for which the UE is to sleep.

In a tenth aspect, in combination with the ninth aspect, the duration is a remaining portion of an active time of a sidelink discontinuous reception operation.

In an eleventh aspect, in combination with one or more of the ninth through tenth aspects, the duration is a quantity of time intervals of an active time of a sidelink discontinuous reception operation.

In a twelfth aspect, in combination with one or more of the ninth through eleventh aspects, the duration is multiple active times of a sidelink discontinuous reception operation.

In a thirteenth aspect, alone or in combination with one or more of the first through twelfth aspects, a duration for which the UE is to sleep, based at least in part on receiving the power saving indication, is indicated by a semi-static configuration or a fixed rule.

In a fourteenth aspect, in combination with the thirteenth aspect, the semi-static configuration or the fixed rule is particular to a sidelink resource pool.

In a fifteenth aspect, alone or in combination with one or more of the first through fourteenth aspects, the UE is to sleep, based at least in part on receiving the power saving indication, until a next wakeup signal occasion of a sidelink discontinuous reception operation.

In a sixteenth aspect, alone or in combination with one or more of the first through fifteenth aspects, performing the power saving operation includes refraining from monitoring wakeup signal occasions during a sleep duration of the UE.

In a seventeenth aspect, alone or in combination with one or more of the first through sixteenth aspects, performing the power saving operation includes monitoring wakeup signal occasions during a sleep duration of the UE.

In an eighteenth aspect, alone or in combination with one or more of the first through seventeenth aspects, the power saving indication further indicates whether the UE is to monitor wakeup signal occasions during a sleep duration of the UE.

In a nineteenth aspect, alone or in combination with one or more of the first through eighteenth aspects, the power saving indication indicates that a sidelink transmission is to occur in a portion of a bandwidth of a sidelink resource pool.

In a twentieth aspect, alone or in combination with one or more of the first through nineteenth aspects, performing the power saving operation includes monitoring a physical sidelink control channel or a physical sidelink shared channel in only a portion of a bandwidth of a sidelink resource pool.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
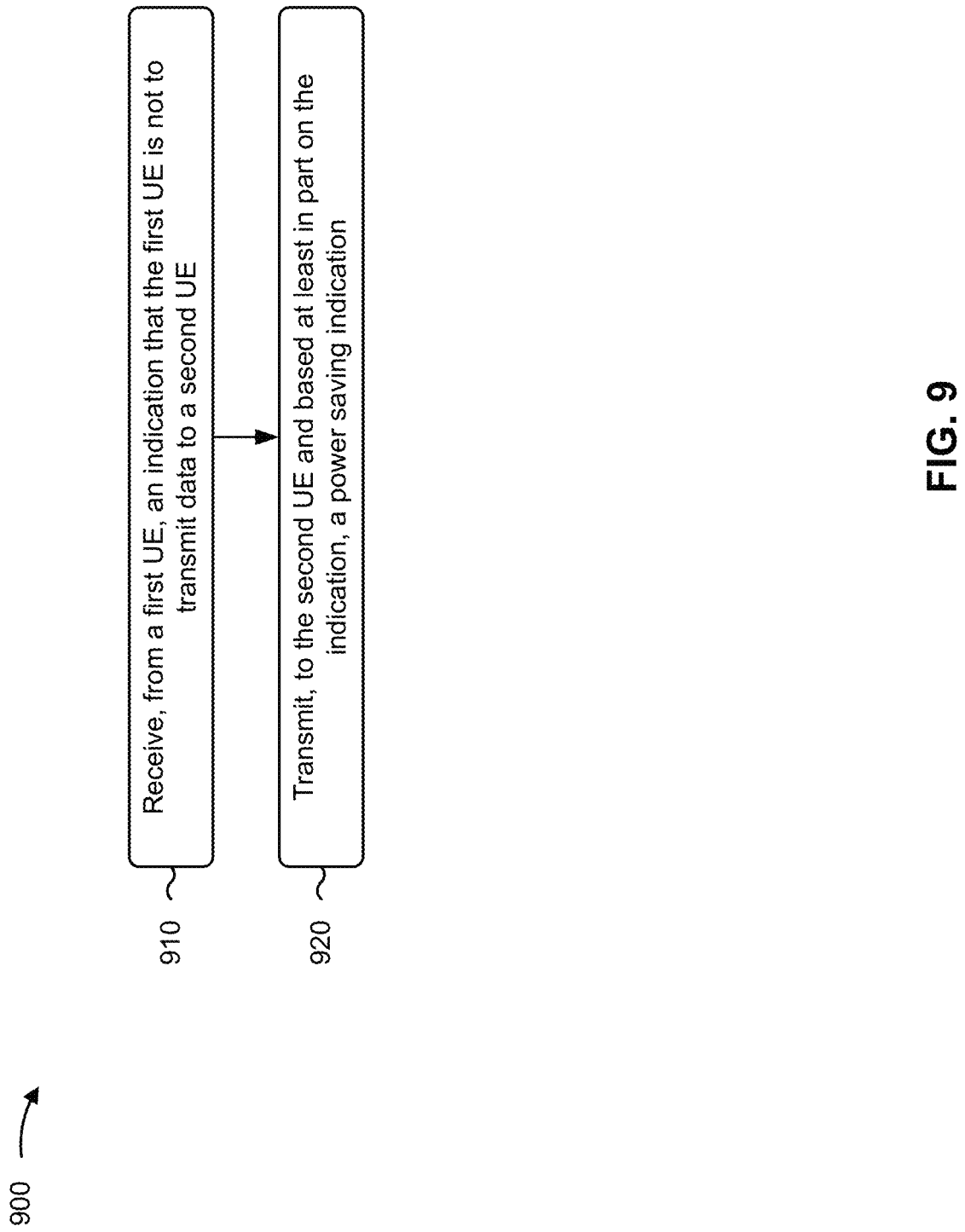

FIG. 9 is a diagram illustrating an example process 900 performed, for example, by a base station, in accordance with the present disclosure. Example process 900 is an example where the base station (e.g., base station 110) performs operations associated with power saving in sidelink.

As shown in FIG. 9, in some aspects, process 900 includes receiving, from a first UE, an indication that the first UE is not to transmit data to a second UE (block 910). The indication may be an indication that the first UE will not transmit data to the second UE, or that the first UE does not intend to transmit data to the second UE. For example, the base station (e.g., using reception component 1102, depicted in FIG. 11) may receive, from a first UE, an indication that the first UE is not to transmit data to a second UE, as described above.

As further shown in FIG. 9, in some aspects, process 900 includes transmitting, to the second UE and based at least in part on the indication, a power saving indication (block 920). The power saving indication may relate to sidelink communication. For example, the base station (e.g., using transmission component 1104, depicted in FIG. 11) may transmit, to the second UE and based at least in part on the indication, a power saving indication, as described above.

Process 900 may include additional aspects, such as any single aspect or any combination of aspects described below and/or in connection with one or more other processes described elsewhere herein.

In a first aspect, the indication is a buffer status report.

In a second aspect, in combination with the first aspect, process 900 includes determining, based at least in part on the buffer status report, that the first UE does not have data for transmission to the second UE.

In a third aspect, alone or in combination with one or more of the first and second aspects, the indication indicates that the first UE does not have data for transmission to the second UE.

In a fourth aspect, alone or in combination with one or more of the first through third aspects, the power saving indication is transmitted during an active time of a sidelink discontinuous reception operation of the second UE.

In a fifth aspect, alone or in combination with one or more of the first through fourth aspects, the power saving indication is transmitted in a physical downlink control channel.

In a sixth aspect, alone or in combination with one or more of the first through fifth aspects, the power saving indication indicates that the second UE is not to receive data from the first UE.

In a seventh aspect, alone or in combination with one or more of the first through sixth aspects, process 900 includes receiving information that identifies a sidelink destination identifier associated with the second UE and an access link identity associated with the second UE that was obtained by the first UE during an exchange of sidelink identity information between the first UE and the second UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
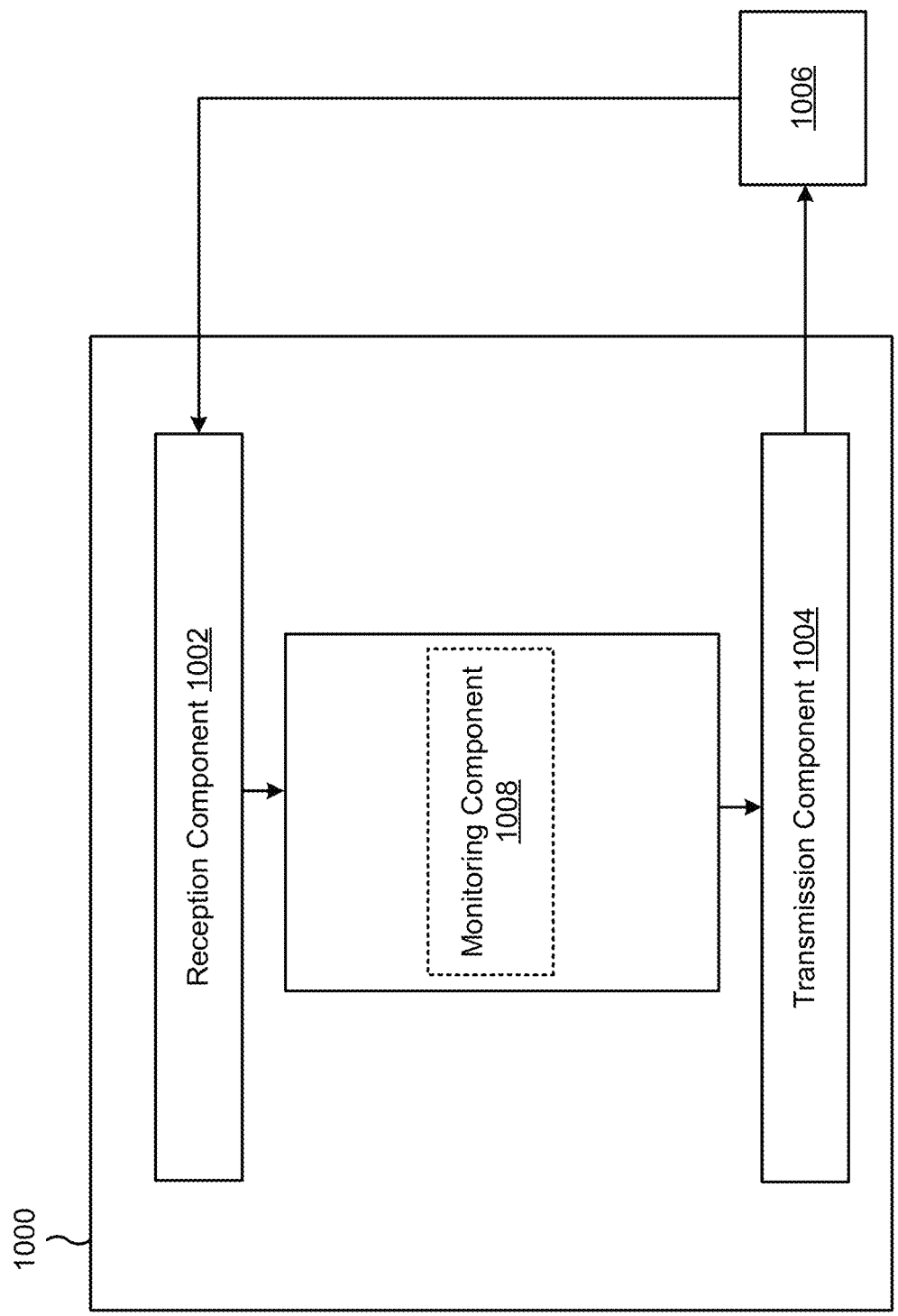
FIGS. 10-11 are diagrams of example apparatuses for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a monitoring component 1008, among other examples.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The reception component 1002 may receive a power saving indication relating to sidelink communication (e.g., during an active time of a sidelink DRX operation). The monitoring component 1008 may perform a power saving operation based at least in part on the power saving indication. For example, the monitoring component 1008 may refrain from monitoring a PSCCH and/or a PSSCH based at least in part on the power saving indication. As another example, the monitoring component 1008 may monitor a PSCCH and/or a PSSCH in only a portion of a bandwidth of a sidelink resource pool based at least in part on the power saving indication.

In some aspects, the transmission component 1004 may transmit, to another UE, a power saving indication relating to sidelink communication (e.g., during an active time of a sidelink DRX operation of the other UE). In some aspects, the transmission component 1004 may transmit a buffer status report and/or an explicit indication of a lack of data for transmission to another UE.

The quantity and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
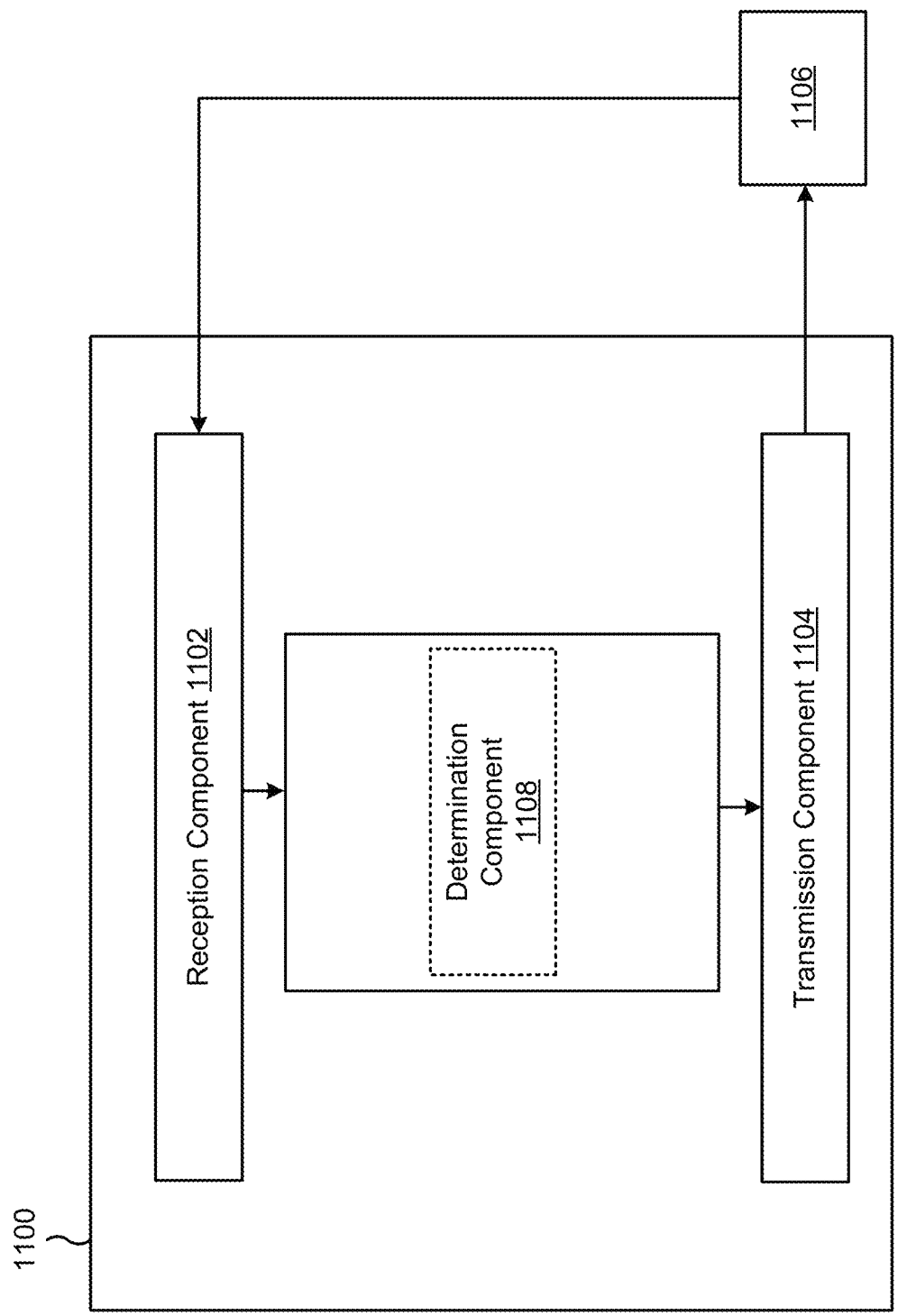

FIG. 11 is a diagram of an example apparatus 1100 for wireless communication, in accordance with the present disclosure. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a determination component 1108, among other examples.

In some aspects, the apparatus 1100 may be configured to perform one or more operations described herein in connection with FIG. 7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

The reception component 1102 may receive, from a first UE, an indication that the first UE is not to transmit data to a second UE. The transmission component 1104 may transmit, to the second UE and based at least in part on the indication, a power saving indication (e.g., during an active time of a sidelink DRX operation of the second UE).

In some aspects, the indication received from the first UE may be a buffer status report. The determination component 1108 may determine, based at least in part on the buffer status report, that the first UE does not have data for transmission to the second UE.

The quantity and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving a power saving indication relating to sidelink communication; and performing a power saving operation based at least in part on the power saving indication.

Aspect 2: The method of Aspect 1, wherein the power saving indication is received during an active time or an on duration of a sidelink discontinuous reception operation.

Aspect 3: The method of any of Aspects 1-2, wherein the power saving indication is received from another UE or a network entity.

Aspect 4: The method of any of Aspects 1-3, wherein the power saving operation is performed based at least in part on transmitting acknowledgment feedback for the power saving indication.

Aspect 5: The method of any of Aspects 1-4, wherein the power saving indication is a sequence-based indication.

Aspect 6: The method of any of Aspects 1-5, wherein the power saving indication is indicated in a communication of a physical sidelink control channel or a physical sidelink shared channel.

Aspect 7: The method of any of Aspects 1-6, wherein the power saving indication identifies at least one of a source identifier or a destination identifier associated with the power saving indication.

Aspect 8: The method of any of Aspects 1-7, wherein the power saving operation is entering a sleep state.

Aspect 9: The method of any of Aspects 1-8, wherein the power saving indication indicates that the UE is to go to sleep.

Aspect 10: The method of any of Aspects 1-9, wherein the power saving indication indicates a duration for which the UE is to sleep.

Aspect 11: The method of Aspect 10, wherein the duration is a remaining portion of an active time of a sidelink discontinuous reception operation.

Aspect 12: The method of Aspect 10, wherein the duration is a quantity of time intervals of an active time of a sidelink discontinuous reception operation.

Aspect 13: The method of Aspect 10, wherein the duration is multiple active times of a sidelink discontinuous reception operation.

Aspect 14: The method of any of Aspects 1-9, wherein a duration for which the UE is to sleep, based at least in part on receiving the power saving indication, is indicated by a semi-static configuration or a fixed rule.

Aspect 15: The method of Aspect 14, wherein the semi-static configuration or the fixed rule is particular to a sidelink resource pool.

Aspect 16: The method of any of Aspects 1-10, wherein the UE is to sleep, based at least in part on receiving the power saving indication, until a next wakeup signal occasion of a sidelink discontinuous reception operation.

Aspect 17: The method of any of Aspects 1-16, wherein performing the power saving operation comprises refraining from monitoring wakeup signal occasions during a sleep duration of the UE.

Aspect 18: The method of any of Aspects 1-16, wherein performing the power saving operation comprises monitoring wakeup signal occasions during a sleep duration of the UE.

Aspect 19: The method of any of Aspects 1-18, wherein the power saving indication further indicates whether the UE is to monitor wakeup signal occasions during a sleep duration of the UE.

Aspect 20: The method of any of Aspects 1-7, wherein the power saving indication indicates that a sidelink transmission is to occur in a portion of a bandwidth of a sidelink resource pool.

Aspect 21: The method of any of Aspects 1-7 or 20, wherein performing the power saving operation comprises monitoring a physical sidelink control channel or a physical sidelink shared channel in only a portion of a bandwidth of a sidelink resource pool.

Aspect 22: A method of wireless communication performed by a network entity, comprising: receiving, from a first user equipment (UE), an indication that the first UE is not to transmit data to a second UE; and transmitting, to the second UE and based at least in part on the indication, a power saving indication.

Aspect 23: The method of Aspect 22, wherein the indication is a buffer status report.

Aspect 24: The method of Aspect 23, further comprising: determining, based at least in part on the buffer status report, that the first UE does not have data for transmission to the second UE.

Aspect 25: The method of Aspect 22, wherein the indication indicates that the first UE does not have data for transmission to the second UE.

Aspect 26: The method of any of Aspects 22-25, wherein the power saving indication is transmitted during an active time or an on duration of a sidelink discontinuous reception operation of the second UE.

Aspect 27: The method of any of Aspects 22-26, wherein the power saving indication is transmitted in a physical downlink control channel.

Aspect 28: The method of any of Aspects 22-27, wherein the power saving indication indicates that the second UE is to go to sleep.

Aspect 29: The method of any of Aspects 22-28, further comprising: receiving, from the first UE, information that identifies a sidelink destination identifier associated with the second UE and an access link identity associated with the second UE that was obtained by the first UE during an exchange of sidelink identity information between the first UE and the second UE.

Aspect 30: An apparatus for wireless communication at a device, comprising a processor; memory coupled with the processor; and instructions stored in the memory and executable by the processor to cause the apparatus to perform the method of one or more Aspects of Aspects 1-21.

Aspect 31: A device for wireless communication, comprising a memory and one or more processors coupled to the memory, the memory and the one or more processors configured to perform the method of one or more Aspects of Aspects 1-21.

Aspect 32: An apparatus for wireless communication, comprising at least one means for performing the method of one or more Aspects of Aspects 1-21.

Aspect 33: A non-transitory computer-readable medium storing code for wireless communication, the code comprising instructions executable by a processor to perform the method of one or more Aspects of Aspects 1-21.

Aspect 34: A non-transitory computer-readable medium storing a set of instructions for wireless communication, the set of instructions comprising one or more instructions that, when executed by one or more processors of a device, cause the device to perform the method of one or more Aspects of Aspects 1-21.

Aspect 35: An apparatus for wireless communication at a device, comprising a processor; memory coupled with the processor; and instructions stored in the memory and executable by the processor to cause the apparatus to perform the method of one or more Aspects of Aspects 22-29.

Aspect 36: A device for wireless communication, comprising a memory and one or more processors coupled to the memory, the memory and the one or more processors configured to perform the method of one or more Aspects of Aspects 22-29.

Aspect 37: An apparatus for wireless communication, comprising at least one means for performing the method of one or more Aspects of Aspects 22-29.

Aspect 38: A non-transitory computer-readable medium storing code for wireless communication, the code comprising instructions executable by a processor to perform the method of one or more Aspects of Aspects 22-29.

Aspect 39: A non-transitory computer-readable medium storing a set of instructions for wireless communication, the set of instructions comprising one or more instructions that, when executed by one or more processors of a device, cause the device to perform the method of one or more Aspects of Aspects 22-29.

Aspect 40: A method of wireless communication performed by a user equipment (UE), comprising: transmitting, to another UE, a power saving indication relating to sidelink communication.

Aspect 41: The method of Aspect 40, wherein the power saving indication is transmitted during an active time or an on duration of a sidelink discontinuous reception operation.

Aspect 42: The method of any of Aspects 40-41, wherein the power saving indication is transmitted in sidelink control information.

Aspect 43: The method of any of Aspects 40-42, wherein the power saving indication is a sequence-based indication.

Aspect 44: The method of any of Aspects 40-43, wherein the power saving indication is indicated in a communication of a physical sidelink control channel or a physical sidelink shared channel.

Aspect 45: The method of any of Aspects 40-44, wherein the power saving indication identifies at least one of a source identifier or a destination identifier associated with the power saving indication.

Aspect 46: The method of any of Aspects 40-45, wherein the power saving indication indicates that the other UE is to go to sleep.

Aspect 47: The method of any of Aspects 40-46, wherein the power saving indication indicates a duration for which the other UE is to sleep.

Aspect 48: The method of Aspect 47, wherein the duration is a remaining portion of an active time of a sidelink discontinuous reception operation.

Aspect 49: The method of Aspect 47, wherein the duration is a quantity of time intervals of an active time of a sidelink discontinuous reception operation.

Aspect 50: The method of Aspect 47, wherein the duration is multiple active times of a sidelink discontinuous reception operation.

Aspect 51: The method of any of Aspects 40-50, wherein the power saving indication further indicates whether the other UE is to monitor wakeup signal occasions during a sleep duration of the other UE.

Aspect 52: The method of any of Aspects 40-45, wherein the power saving indication indicates that a sidelink transmission is to occur in a portion of a bandwidth of a sidelink resource pool.

Aspect 53: An apparatus for wireless communication at a device, comprising a processor; memory coupled with the processor; and instructions stored in the memory and executable by the processor to cause the apparatus to perform the method of one or more Aspects of Aspects 40-52.

Aspect 54: A device for wireless communication, comprising a memory and one or more processors coupled to the memory, the memory and the one or more processors configured to perform the method of one or more Aspects of Aspects 40-52.

Aspect 55: An apparatus for wireless communication, comprising at least one means for performing the method of one or more Aspects of Aspects 40-52.

Aspect 56: A non-transitory computer-readable medium storing code for wireless communication, the code comprising instructions executable by a processor to perform the method of one or more Aspects of Aspects 40-52.

Aspect 57: A non-transitory computer-readable medium storing a set of instructions for wireless communication, the set of instructions comprising one or more instructions that, when executed by one or more processors of a device, cause the device to perform the method of one or more Aspects of Aspects 40-52.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
receive, from another UE and during an active time or an on duration of a sidelink discontinuous reception operation, a power saving indication relating to sidelink communication, the power saving indication indicating a quantity of time intervals of the active time or the on duration of the sidelink discontinuous reception operation or multiple active times or on durations of the sidelink discontinuous reception operation and that the UE is to refrain from monitoring wakeup signal occasions during a sleep duration of the UE; and
perform a power saving operation based at least in part on the power saving indication.

2. The UE of claim 1, wherein the power saving operation is performed based at least in part on transmitting acknowledgment feedback for the power saving indication.

3. The UE of claim 1, wherein the power saving indication is a sequence-based indication.

4. The UE of claim 1, wherein the power saving indication is indicated in a communication of a physical sidelink control channel or a physical sidelink shared channel.

5. The UE of claim 1, wherein the power saving indication identifies at least one of a source identifier or a destination identifier associated with the power saving indication.

6. The UE of claim 1, wherein the power saving indication indicates that the UE is not to receive data from the other UE.

7. The UE of claim 1, wherein a duration for which the UE is to sleep, based at least in part on receiving the power saving indication, is indicated by a semi-static configuration or a fixed rule, and
wherein the semi-static configuration or the fixed rule is for a particular sidelink resource pool.

8. The UE of claim 1, wherein the UE is to enter a sleep state based at least in part on receiving a power saving indication for each sidelink session of the UE.

9. The UE of claim 1, wherein the one or more processors, to perform the power saving operation, are configured to refrain from monitoring the wakeup signal occasions during the sleep duration of the UE.

10. A network entity for wireless communication, comprising:
one or more memories; and
one or more processors, coupled to the one or more memories, configured to:
receive, from a first user equipment (UE), information that identifies a sidelink destination identifier associated with a second UE and an access link identity associated with the second UE that was obtained by the first UE during an exchange of sidelink identity information between the first UE and the second UE;
receive, from the first UE, an indication that the first UE is not to transmit data to the second UE; and
transmit, to the second UE and based at least in part on the indication, a power saving indication relating to sidelink communication, the power saving indication indicating that the second UE is to go to sleep.

11. The network entity of claim 10, wherein the indication is a buffer status report.

12. The network entity of claim 11, wherein the one or more processors are further configured to:
determine, based at least in part on the buffer status report, that the first UE does not have data for transmission to the second UE.

13. The network entity of claim 10, wherein the indication indicates that the first UE does not have data for transmission to the second UE.

14. The network entity of claim 10, wherein the power saving indication is transmitted during an active time or an on duration of a sidelink discontinuous reception operation of the second UE.

15. The network entity of claim 10, wherein the power saving indication is transmitted in a physical downlink control channel.

16. The network entity of claim 10, wherein the power saving indication indicates that the second UE is not to receive data from the first UE.

17. A method of wireless communication performed by a user equipment (UE), comprising:
receiving, from another UE and during an active time or an on duration of a sidelink discontinuous reception operation, a power saving indication relating to sidelink communication, the power saving indication indicating a quantity of time intervals of the active time or the on duration of the sidelink discontinuous reception operation or multiple active times or on durations of the sidelink discontinuous reception operation and that the UE is to refrain from monitoring wakeup signal occasions during a sleep duration of the UE; and
performing a power saving operation based at least in part on the power saving indication.

18. The method of claim 17, wherein the power saving operation is performed based at least in part on transmitting acknowledgment feedback for the power saving indication.

19. The method of claim 17, wherein performing the power saving operation is indicated in a communication of a physical sidelink control channel or a physical sidelink shared channel.

20. The method of claim 17, wherein the power saving indication is a sequence-based indication.

21. The method of claim 17, wherein the power saving indication identifies at least one of a source identifier or a destination identifier associated with the power saving indication.

22. The method of claim 17, wherein the power saving indication indicates that the UE is not to receive data from the other UE.

23. The method of claim 17, wherein a duration for which the UE is to sleep, based at least in part on receiving the power saving indication, is indicated by a semi-static configuration or a fixed rule, and
wherein the semi-static configuration or the fixed rule is for a particular sidelink resource pool.

24. A method of wireless communication performed by a network entity, comprising:
receiving, from a first user equipment (UE), information that identifies a sidelink destination identifier associated with a second UE and an access link identity associated with the second UE that was obtained by the first UE during an exchange of sidelink identity information between the first UE and the second UE;
receiving, from the first UE, an indication that the first UE is not to transmit data to the second UE; and transmitting, to the second UE and based at least in part on the indication, a power saving indication relating to sidelink communication, the power saving indication indicating that the second UE is to go to sleep.

25. The method of claim 24, wherein the power saving indication is transmitted during an active time or an on duration of a sidelink discontinuous reception operation of the second UE.

26. The method of claim 24, wherein the indication is a buffer status report.

27. The method of claim 26, further comprising:
determining, based at least in part on the buffer status report, that the first UE does not have data for transmission to the second UE.

28. The method of claim 24, wherein the indication indicates that the first UE does not have data for transmission to the second UE.

29. The method of claim 24, wherein the power saving indication is transmitted in a physical downlink control channel.

30. The method of claim 24, wherein the power saving indication indicates that the second UE is not to receive data from the first UE.

* * * * *